(12) United States Patent
Kang

(10) Patent No.: US 7,710,437 B2
(45) Date of Patent: May 4, 2010

(54) COLOR INTERPOLATION ALGORITHM

(75) Inventor: Yong-Sung Kang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 802 days.

(21) Appl. No.: 11/317,765

(22) Filed: Dec. 23, 2005

(65) Prior Publication Data
US 2006/0146150 A1 Jul. 6, 2006

(30) Foreign Application Priority Data
Dec. 30, 2004 (KR) .................. 10-2004-0116951

(51) Int. Cl.
G09G 5/00 (2006.01)
(52) U.S. Cl. .................................................... 345/606
(58) Field of Classification Search ................ 345/606, 345/613; 348/222, 273
See application file for complete search history.

(56) References Cited

U.S. PATENT DOCUMENTS

| | | | | |
|---|---|---|---|---|
| 5,373,322 A | * | 12/1994 | Laroche et al. | 348/273 |
| 5,382,976 A | * | 1/1995 | Hibbard | 348/273 |
| 5,629,734 A | * | 5/1997 | Hamilton et al. | 348/222.1 |
| 5,805,217 A | * | 9/1998 | Lu et al. | 348/273 |
| 6,388,673 B1 | * | 5/2002 | Egan | 345/581 |
| 6,487,309 B1 | * | 11/2002 | Chen | 382/162 |
| 6,697,110 B1 | * | 2/2004 | Jaspers et al. | 348/272 |
| 7,236,628 B2 | * | 6/2007 | Chen et al. | 382/167 |
| 2001/0005429 A1 | * | 6/2001 | Ishiga et al. | 382/167 |
| 2002/0047907 A1 | * | 4/2002 | Chen et al. | 348/222 |
| 2002/0101524 A1 | * | 8/2002 | Acharya | 348/273 |

FOREIGN PATENT DOCUMENTS

| | | |
|---|---|---|
| EP | 0632663 | 1/1995 |
| EP | 1109411 | 6/2001 |
| JP | 11136692 | 5/1999 |
| JP | 2000244934 | 9/2000 |
| WO | WO9959345 | 11/1999 |

OTHER PUBLICATIONS

Pedrycz W, "Optimization schemes for decomposition of fuzzy relations" Fuzzy sets and systems, elsevier science publishers, Amsterdam, NL. Nov. 16, 1998.

* cited by examiner

*Primary Examiner*—Ulka Chauhan
*Assistant Examiner*—Jeffrey J Chow
(74) *Attorney, Agent, or Firm*—Lee, Hong, Degerman, Kang & Waimey

(57) ABSTRACT

A method for interpolating pixel colors in a digital system is provided. The method comprises obtaining at least two pixels of a first color having a first level of similarity, wherein the at least two pixels are positioned adjacent a first pixel to be restored; calculating average values of the two pixels for the first color; restoring the value of the at least two pixels for the first color; and restoring a value associated with a second color for the at least two pixels by an interpolation method using a gradient of a brightness.

17 Claims, 6 Drawing Sheets

$$G_{ij} = \frac{1}{2}(G_{ij} \equiv G_{ij})(G_{ij} + G_{ij})$$

$$R_{ij} = \frac{(R_{i,j-1} - G_{i,j-1}) + (R_{i,j+1} - G_{i,j+1})}{2} + G_{ij}$$

$$B_{ij} = \frac{(B_{i,j-1} - G_{i,j-1}) + (B_{i,j+1} - G_{i,j+1})}{2} + G_{ij}$$

FIG. 1A
Related Art

| G1 | R2 | G3 | R4 | G5 |
|----|----|----|----|----|
| B6 | G7 | B8 | G9 | B10 |
| G11 | R12 | G13 | R14 | G15 |
| B16 | G17 | B18 | G19 | B20 |
| G21 | R22 | G23 | R24 | G25 |

$$G_8 = \frac{G_3 + G_7 + G_9 + G_{13}}{4}$$

FIG. 1B
Related Art

| G1 | R2 | G3 | R4 | G5 |
|----|----|----|----|----|
| B6 | G7 | B8 | G9 | B10 |
| G11 | R12 | G13 | R14 | G15 |
| B16 | G17 | B18 | G19 | B20 |
| G21 | R22 | G23 | R24 | G25 |

$$R_8 = G_8 \frac{\frac{R_2}{G_2} + \frac{R_4}{G_4} + \frac{R_{12}}{G_{12}} + \frac{R_{14}}{G_{14}}}{4}$$

FIG. 2A
Related Art

| R11 | G12 | R13 | G14 | R15 | G16 | R17 |
|-----|-----|-----|-----|-----|-----|-----|
| G21 | B22 | G23 | B24 | G25 | B26 | G27 |
| R31 | G32 | R33 | G34 | R35 | G36 | R37 |
| G41 | B42 | G43 | B44 | G45 | B46 | G47 |
| R51 | G52 | R53 | G54 | R55 | G56 | R57 |
| G61 | B62 | G63 | B64 | G65 | B66 | G67 |
| R71 | G72 | R73 | G74 | R75 | G76 | R77 |

$$\alpha = abs[(B_{42} + B_{46})/2 - B_{44}]$$

$$\beta = abs[(B_{24} + B_{64})/2 - B_{44}]$$

$$G_{44} = \begin{cases} (G_{43} + G_{45})/2, & \text{if } \alpha < \beta \\ (G_{34} + G_{54})/2, & \text{if } \alpha > \beta \\ (G_{43} + G_{45} + G_{34} + G_{54})/4, & \text{if } \alpha = \beta \end{cases}$$

FIG. 2B
Related Art

| R11 | G12 | R13 | G14 | R15 | G16 | R17 |
|-----|-----|-----|-----|-----|-----|-----|
| G21 | B22 | G23 | B24 | G25 | B26 | G27 |
| R31 | G32 | R33 | G34 | R35 | G36 | R37 |
| G41 | B42 | G43 | B44 | G45 | B46 | G47 |
| R51 | G52 | R53 | G54 | R55 | G56 | R57 |
| G61 | B62 | G63 | B64 | G65 | B66 | G67 |
| R71 | G72 | R73 | G74 | R75 | G76 | R77 |

$$R_{34} = \frac{(R_{33} - G_{33}) + (R_{35} - G_{35})}{2} + G_{34}$$

FIG. 3
Related Art

| R11 | G12 | R13 | G14 | R15 | G16 | R17 |
|-----|-----|-----|-----|-----|-----|-----|
| G21 | B22 | G23 | B24 | G25 | B26 | G27 |
| R31 | G32 | R33 | G34 | R35 | G36 | R37 |
| G41 | B42 | G43 | B44 | G45 | B46 | G47 |
| R51 | G52 | R53 | G54 | R55 | G56 | R57 |
| G61 | B62 | G63 | B64 | G65 | B66 | G67 |
| R71 | G72 | R73 | G74 | R75 | G76 | R77 |

$$G_{diff\_hor} = abs[G_{54} - G_{34}]$$

$$G_{diff\_ver} = abs[G_{43} - G_{45}]$$

FIG. 4

| R11 | G12 | R13 | G14 | R15 | G16 | R17 |
|-----|-----|-----|-----|-----|-----|-----|
| G21 | B22 | G23 | B24 | G25 | B26 | G27 |
| R31 | G32 | R33 | G34 | R35 | G36 | R37 |
| G41 | B42 | G43 | B44 | G45 | B46 | G47 |
| R51 | G52 | R53 | G54 | R55 | G56 | R57 |
| G61 | B62 | G63 | B64 | G65 | B66 | G67 |
| R71 | G72 | R73 | G74 | R75 | G76 | R77 |

$$G_{ij} = \frac{1}{2}(G_{ij} \equiv G_{ij})(G_{ij} + G_{ij})$$

$$R_{ij} = \frac{(R_{i,j-1} - G_{i,j-1}) + (R_{i,j+1} - G_{i,j+1})}{2} + G_{ij}$$

$$B_{ij} = \frac{(B_{i,j-1} - G_{i,j-1}) + (B_{i,j+1} - G_{i,j+1})}{2} + G_{ij}$$

COLOR INTERPOLATION ALGORITHM

CROSS REFERENCE TO RELATED APPLICATION

Pursuant to 35 U.S.C. §119(a), this application claims the benefit of earlier filing date and right of priority to Korean Application No. 116951/2004, filed Dec. 30, 2004, the contents of which are hereby incorporated by reference herein in their entirety.

FIELD OF THE INVENTION

The present invention relates to color interpolation, and more particularly, to color interpolation in a Bayer pattern color filter.

BACKGROUND OF THE INVENTION

Generally, a digital photographing device such as a digital camera or digital camcorder uses a charge coupled device (CCD) that uses various information for each pixel in order to obtain a full-color image. At least three types of color data are required in order to display an image viewable by human eye. A full-color image can be rendered based on pixel values for three independent colors, R, G, and B.

The CCD is a photographing device for converting an optical signal into an electric signal. CCD may be a single chip type or a multi-chip type. In a multi-chip type, each pixel receives three colors by using three chips having sensors reactive to three colors (R, G, and B) respectively. In the single chip type, each pixel receives only one color, and a color filter array (CFA) having sensors reactive to each color. The most general pattern of the CFA is a Bayer pattern.

In case of the multi-chip type, each color for constituting one screen has information for the entire screen. Accordingly, it is possible to re-construct the entire screen by using the colors. However, in case of the single-chip type shown in FIG. 1, each pixel is provided with a different sensor for receiving a different color, even if sensors for receiving three colors are positioned on one chip. Accordingly, each pixel has only one color information among three colors.

For example, in case that a B pixel or a R pixel has no green detecting sensor to restore a green color value (G value), green is rendered by using information received by a green detecting sensor of an adjacent pixel. That is, a color interpolation algorithm for rendering the green color is used.

The related art color interpolation method in the single-chip type Bayer pattern color filter comprises a bi-linear interpolation method, a color shift interpolation method, and an adaptive interpolation method using a gradient of a brightness. Each interpolation method is explained below.

FIG. 1A is a view showing a 5×5 Bayer pattern in a bi-linear interpolation method. As shown, in the bi-linear interpolation method, color information of the most adjacent four pixels (G3, G7, G9, and G13) is used in order to restore a G value (for example G8), and an average of the adjacent four pixels (G3, G7, G9 and G13) is used as shown in the following formula 1.

$$G_8 = \frac{G_3 + G_7 + G_9 + G_{13}}{4} \quad \text{[Formula 1]}$$

FIG. 1B is a view showing a 5×5 Bayer pattern in a color shift interpolation method. As shown, the color shift interpolation method is for obtaining all the adjacent G values by using the bi-linear method and then obtaining an R8 by using a previously-obtained G8 based on an R-value known by a sensor.

It is assumed that a ratio between an R value and a G value adjacent to a pixel B8 to be restored is constant, and then an average for the ratio between the R value and the G value is calculated among the adjacent four pixels G2, G4, G12, and G14. As shown in the following formula 2, the calculated average value and the G value (G8) of the pixel (B8) are multiplied to each other thereby to restore the R value (R8).

$$R_8 = G_8 \frac{\frac{R_2}{G_2} + \frac{R_4}{G_4} + \frac{R_{12}}{G_{12}} + \frac{R_{14}}{G_{14}}}{4} \quad \text{[Formula 2]}$$

FIGS. 2A and 2B are views showing a Bayer pattern in an adaptive interpolation method using a gradient of a brightness. In FIG. 2A, $\alpha$ denotes vertical edge information, and $\beta$ denotes horizontal edge information. The following formula 3 is used to obtain the vertical edge information $\alpha$ and the horizontal edge information $\beta$.

$$\alpha = abs[(B_{42}+B_{46})/2 - B_{44}]$$

$$\beta = abs[(B_{24}+B_{64})/2 - B_{44}] \quad \text{[Formula 3]}$$

Once the vertical edge information $\alpha$ and the horizontal edge information $\beta$ are obtained, it can be determined if a color shift is less in a horizontal axis direction or in a vertical axis direction. If $\alpha$ is less than $\beta$, the color shift in the horizontal axis direction is less than the color shift in the vertical axis direction. On the other hand, if $\alpha$ is greater than $\beta$, an average value between G34 and G54 is determined as G44. Also, if the $\alpha$ is equal to the $\beta$, an average value among the adjacent values, G34, G43, G45, and G54 is determined as G44 (Refer to formula 4).

$$G_{44} = \begin{cases} (G_{43} + G_{45})/2, & \text{if } \alpha < \beta \\ (G_{34} + G_{54})/2, & \text{if } \alpha > \beta \\ (G_{43} + G_{45} + G_{34} + G_{54})/4, & \text{if } \alpha = \beta \end{cases} \quad \text{[Formula 4]}$$

When a G value (for example G44) has been restored, as shown in FIG. 2B, an R value and a B value are obtained in a condition that a ratio between R and G values (R:G) and a ratio between B and G values (B:G) are constant (Refer to formula 5).

$$R_{34} = \frac{(R_{33} - G_{33}) + (R_{35} - G_{35})}{2} + G_{34} \quad \text{[Formula 5]}$$

$$B_{34} = \frac{(B_{33} - G_{33}) + (B_{35} - G_{35})}{2} + G_{34}$$

FIG. 3 is a view showing a Bayer pattern in an adaptive interpolation method using a gradient of a brightness. $G_{\textit{diff\_ver}}$ of FIG. 3 denotes a difference between right and left values of a pixel to be restored (for example G44), and $G_{\textit{diff\_hor}}$ denotes a difference between upper and lower values of the pixel to be restored (for example G44).

The following formula 6 is used to obtain a vertical value and a horizontal value ($G_{diff\_ver}$, $G_{diff\_hor}$).

$$G_{diff\_hor}=abs[G_{54}-G_{34}]$$

$$G_{diff\_ver}=abs[G_{43}-G_{45}] \quad [\text{Formula 6}]$$

The obtained horizontal and vertical values ($G_{diff\_ver}$, $G_{diff\_hor}$) are compared with arbitrarily set thresholds to determine a G value by using the following formulas.

($G_{diff\_hor}$>threshold)AND($G_{diff\_ver}$>threshold)

$$\rightarrow G_{44}=(G_{34}+G_{45}+G_{54}+G_{43})/4 \quad 1.$$

($G_{diff\_hor}$<=threshold)AND($G_{diff\_ver}$<=threshold)

$$\rightarrow G_{44}=(G_{34}+G_{45}+G_{54}+G_{43})/4 \quad 2.$$

($G_{diff\_hor}$<=threshold)AND($G_{diff\_ver}$>threshold)

$$\rightarrow G_{44}=(G_{43}+G_{45})/2 \quad 3.$$

($G_{diff\_hor}$>threshold)AND($G_{diff\_ver}$<=threshold)

$$\rightarrow G_{44}=(G_{34}+G_{54})/2 \quad 4.$$

When the G value for every pixel is restored by the above formulas, an R value and a B value are restored in the same manner as the interpolation method by using a gradient of a brightness. The thresholds are differently set according to each image sensor thereby to optimize each image sensor.

The interpolation method can be largely divided into a bi-linear interpolation method, a color correction interpolation method, and an interpolation method using a spatial correlation. The bi-linear interpolation method requires less calculation and is simple to implement. However, the method causes a zipper effect and a blurring phenomenon.

The color correction method comprises a color shift interpolation method, and an implementation method using a gradient of a brightness. The color correction method maintains a soft color by using a color difference and a color ratio. The color correction implementation method is provided at a camera due to a simple implementation and a constant color.

The interpolation method using a spatial correlation produces the best quality image by using a color difference and a shift ratio. However, the method's implementation is complicated and requires heavy calculations. Also, since the method uses only upper/lower components and right/left components, a blurring phenomenon may result when a biased line or an edge exists in an actual image.

In the related art interpolation methods, when calculation is simple, picture quality is reduced. And when calculation is complicated, picture quality is improved but calculation overhead is increased. Also, in case of a diagonal image or a biased image, picture quality is reduced since only the upper, lower, right, and left components are considered without consideration of the diagonal components.

A solution to the above problems is needed.

SUMMARY OF THE INVENTION

The foregoing and other objects, features, aspects and advantages of the present invention will become more apparent from the following detailed description of the present invention when taken in conjunction with the accompanying drawings.

In accordance with one aspect of the invention, an interpolation method comprises calculating a similarity among a plurality of pixels of a first color positioned adjacent to a first pixel to be restored; calculating an average value associated with the first color of at least two pixels from among said plurality of pixels, the at least two pixels having a first level of similarity; restoring a first color value associated with the first color for the first pixel; and restoring values associated with a second color and a third color for the first pixel based on an interpolation using a brightness gradient.

In one embodiment, calculating the similarity comprises regularizing first color values of the plurality of pixels adjacent to the first pixel. In another embodiment, calculating the similarity comprises obtaining a similarity among pixels of the first color adjacent to the first pixel. Calculating the average value may comprise multiplying an arithmetic average value of at least two pixels having the first level similarity by the similarity value between said at least two pixels.

In a preferred embodiment, the plurality of pixels are arranged according to a Bayer pattern. The first pixel may be either a blue or a red pixel. The first color may be green; the second color red; and the third color blue, for example. In a preferred embodiment, the first level of similarity is the highest level of similarity.

In accordance with yet another embodiment, a method for interpolating pixel colors is provided. The method comprises obtaining at least two pixels of a first color having a first level of similarity, wherein the at least two pixels are positioned adjacent a first pixel to be restored; calculating average values of the two pixels for the first color and thereby restoring the value of the at least two pixels for the first color.

In one embodiment, a value associated with a second color for the at least two pixels is restored by an interpolation method using a gradient of a brightness. A value associated with a third color for the at least two pixels may be obtained by an interpolation method using a gradient of a brightness.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 1A illustrates a 5×5 Bayer pattern in a bi-linear interpolation method.

FIG. 1B illustrates a 5×5 Bayer pattern in a color shift interpolation method.

FIGS. 2A and 2B illustrate a Bayer pattern in an interpolation method by a gradient.

FIG. 3 illustrates a Bayer pattern in an adaptive interpolation method using a gradient of a brightness.

FIG. 4 illustrates a Bayer pattern in a color interpolation method according to one embodiment of the invention.

Reference will now be made in detail to the preferred embodiments of the present invention, examples of which are illustrated in the accompanying drawings.

DETAILED DESCRIPTION OF THE PREFERRED EMBODIMENTS

Figure 5:
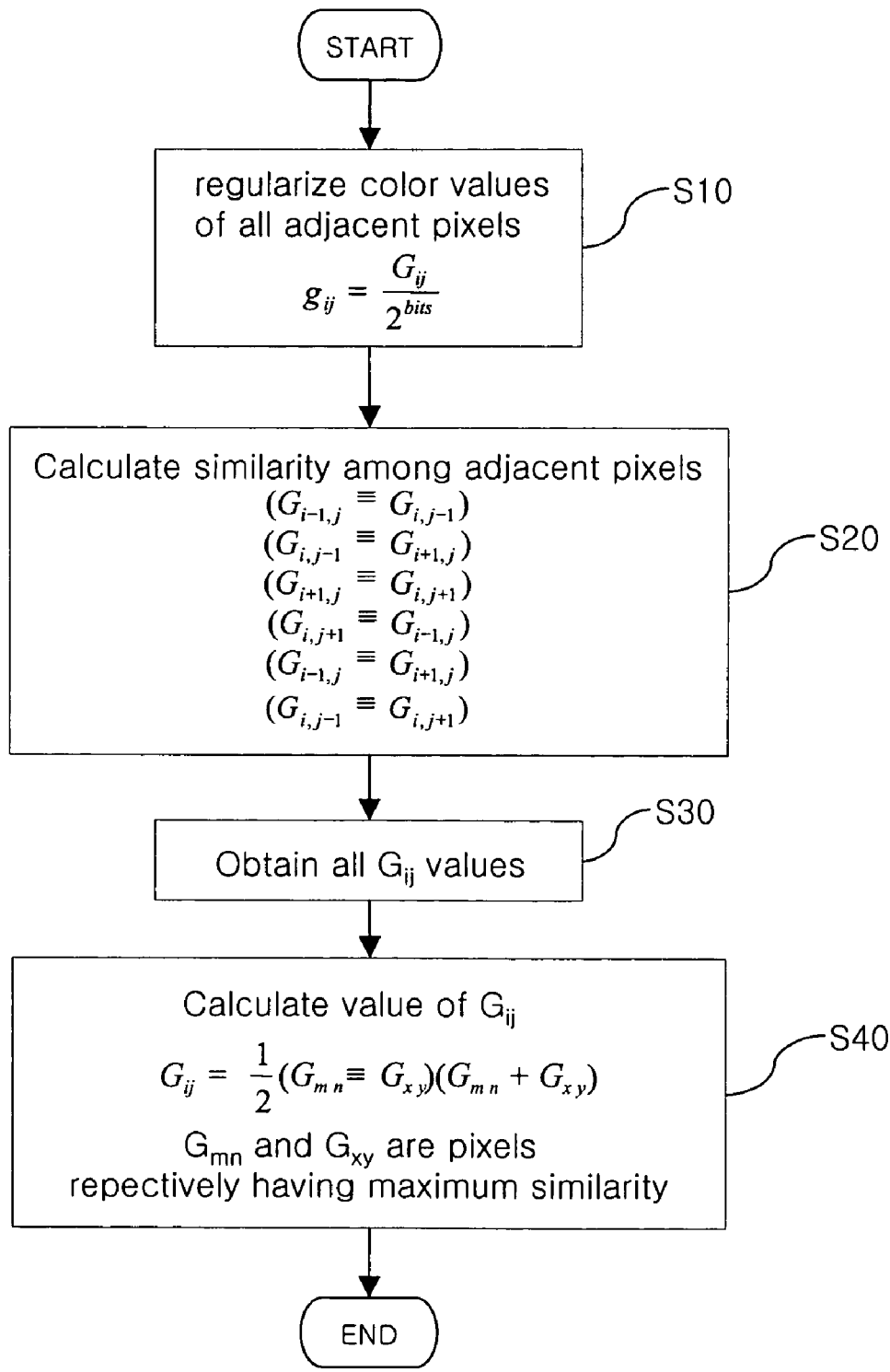
FIG. 5 illustrates a method for restoring a green color according to one embodiment of the invention.

Referring to FIGS. 4 and 5, in an exemplary color interpolation method, a pixel B44 is a blue pixel having no green information and red information. In order to restore a green value of the B44, G values of adjacent pixels G34, G43, G45, and G54 of the B44 are measured and regularized and a similarity among the adjacent pixels G34, G43, G45, and G54 is calculated.

The similarity is defined by determining how much color information of pixels is similar to each other, and is calculated by the following formula 7, for example.

$$a \equiv b = \frac{1}{2}[\min(a \to b, b \to a) + \min(\bar{a} \to \bar{b}, \bar{b} \to \bar{a})] \quad \text{[Formula 7]}$$

Where similarity between a and b is a≡b, a,b∈[0,1] and $\bar{a}=1-a$, $\bar{b}=1-b$. In formula 7, the operator '→' provides a multi-valued implication and is defined by various methods. In one embodiment, a Lukasiewicz implication method is used. The Lukasiewicz implication method is defined by the following formula 8.

$$a \to b = \begin{cases} 1 & \text{if } a \leq b \\ 1-a+b & \text{otherwize} \end{cases} \quad \text{[Formula 8]}$$

Referring to FIG. 5, by applying formula 7 to formula 8, the similarity between two pixels a and b (a≡b) can be determined. Since the values of a and b are in a range of '0~1' in the formula 7, values of R, G, and B for one or more adjacent pixels are regularized to be in a range of '0~1' (S10). For a pixel defined as $R_{ij}$, the $R_{ij}$ is regularized by the following formula 9.

$$N(R_{ij}) = \frac{R_{ij}}{2^{bits}} \quad \text{[formula 9]}$$

The i and j are integers associated with each index, and the bits define in which bits a photographing device displays value of each pixel. When the pixels are regularized by formula 9, a similarity between pixels is obtained by the formula 7 (S20).

The following formula 10 is used in one embodiment to calculate the similarity between G34 and G43. Small letter $g_{ij}$ is a value obtained by regularizing the $G_{ij}$.

$$G_{34} \equiv G_{43} \quad \text{[Formula 10]}$$
$$= \frac{1}{2}\begin{bmatrix} \min(g_{34} \to g_{43}, g_{43} \to g_{34}) + \\ \min(\bar{g}_{34} \to \bar{g}_{43}, \bar{g}_{43} \to \bar{g}_{34}) \end{bmatrix}$$

The following formula 11 is used to calculate a value of $g_{34} \to g_{43}$ by using formula 8.

$$g_{34} \to g_{43} = \begin{cases} 1 & \text{if } g_{34} \leq g_{43} \\ 1-g_{34}+g_{43} & \text{otherwize} \end{cases} \quad \text{[Formula 11]}$$

Each similarity among the four upper, lower, right, and left pixels adjacent to the pixel to be restored (for example B44) is obtained by using formulas 7 and 8 (S30). Accordingly pixels having the highest similarity are obtained (S40).

That is, if a G value G44 of the pixel B44 is to be restored, a similarity among adjacent pixels (G34, G43, G45, and G54) in horizontal, vertical, and diagonal directions, $G_{34} \equiv G_{43}$, $G_{43} \equiv G_{45}$, $G_{45} \equiv G_{54}$, $G_{54} \equiv G_{34}$, $G_{34} \equiv G_{45}$ $G_{43} \equiv G_{54}$ are respectively obtained. In one embodiment, the highest similarity may be obtained by the following formula 12.

$$\text{Max}[G_{34} \equiv G_{43}, G_{43} \equiv G_{45}, G_{45} \equiv G_{54}, G_{54} \equiv G_{34}, G_{34} \equiv G_{45}, G_{43} \equiv G_{54}] \quad \text{Formula 12}$$

If two pixels (for example G34 and G43) are determined to be highly similar, the two pixels (e.g., G34 and G43) have a higher possibility to be consistent with a G value of the pixel to be restored (B44). However, even if the two pixels are determined to have the highest similarity, when degree of similarity among the four adjacent pixels is very low, the two pixel may not be highly similar.

Accordingly, the similarity of the two pixels (e.g., G34 and G43) having the highest similarity $G_{43} \equiv G_{54}$) is multiplied to an arithmetic average (½ (G34+G43)) of the two pixels. The higher the similarity between the two pixels, the nearer the G value (G44) of the pixel to be restored is to the two pixels. The lower the similarity between the two pixels, the farther the G value (G44) of the pixel to be restored is from the two pixels.

Formula 13 is used to obtain the G value G44 of the B44 in case that the G34 and G43 have the highest similarity among the adjacent pixels.

$$G_{44} = \frac{1}{2}(G_{34} \equiv G_{43})(G_{34} + G_{43}) \quad \text{[Formula 13]}$$

Figure 6:
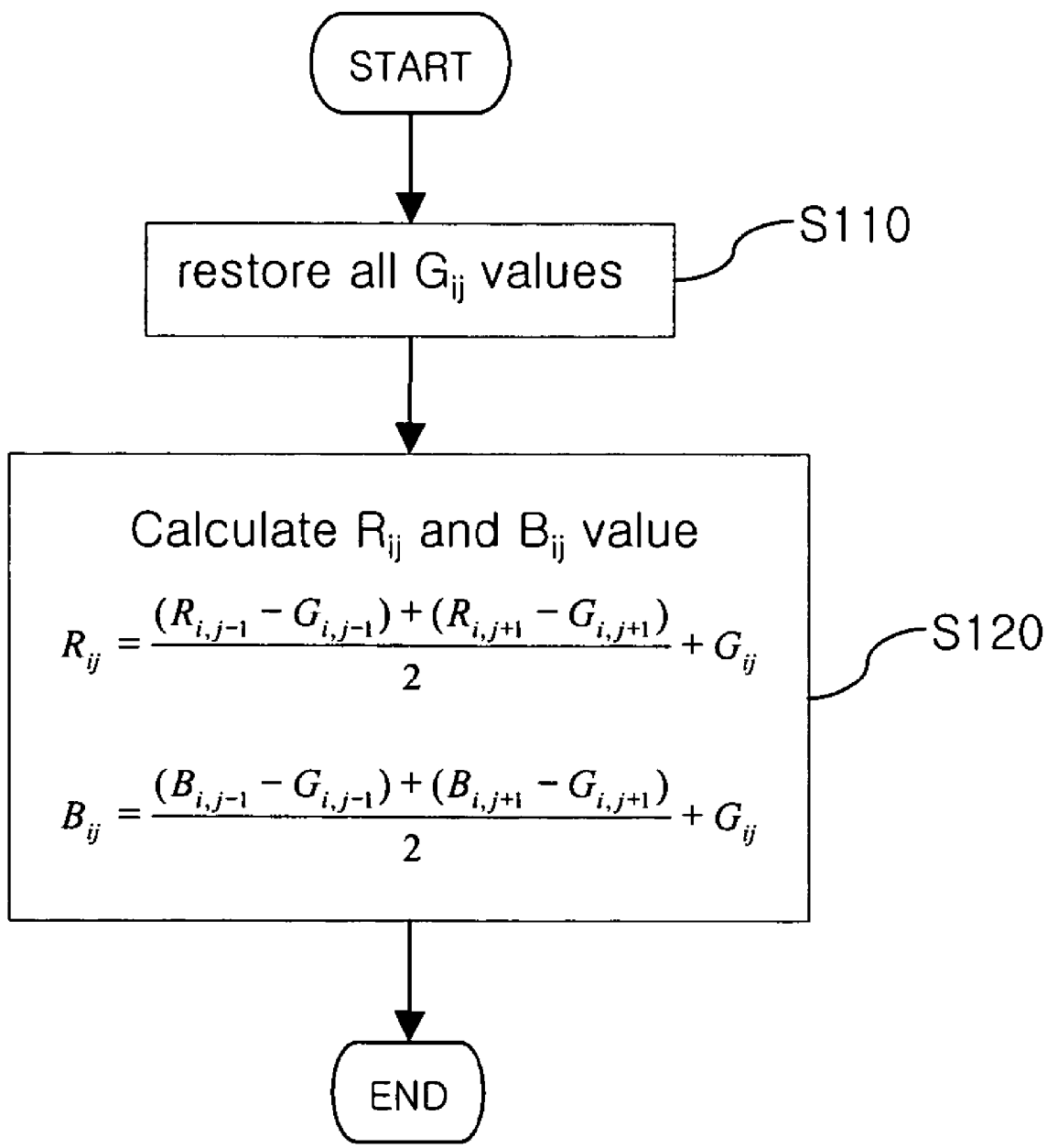
FIG. 6 illustrates a method for restoring a red color or a blue color according to one embodiment of the invention.

FIG. 6 illustrates a method for restoring a red color or a blue color according to one embodiment of the invention. The green values G of the blue pixels Bij and the red pixels Rij are restored as provided above (S110). R values and B values that have not been restored are calculated in the same manner as the interpolation method by a gradient (S120).

When the ratio between an R value and a G value adjacent to a pixel to be restored (R:G) and a ratio between the B value and the G value adjacent to the pixel to be restored (B:G) are constant, the R value (Rji) and the B value (Bij) are obtained by the following formula 14.

$$R_{ij} = \frac{(R_{i,j-1} - G_{i,j-1}) + (R_{i,j+1} - G_{i,j+1})}{2} + G_{ij} \quad \text{[Formula 14]}$$
$$B_{ij} = \frac{(B_{i,j-1} - G_{i,j-1}) + (B_{i,j+1} - G_{i,j+1})}{2} + G_{ij}$$

Accordingly horizontal and vertical components and diagonal component are considered to reduce a blurring phenomenon when biased or edged portions are implemented. Additionally, a similarity among adjacent pixels to a pixel to be restored is measured and an average value of green values of two pixels having a highest similarity is multiplied by the similarity therebetween. Using the weight sum method, in one embodiment, a clearer image can be obtained.

As the invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims.

What is claimed is:

1. An interpolation method for a display, comprising:
  calculating a color similarity value among a plurality of pixels of a first color of the display, the plurality of pixels being adjacent to a first pixel to be restored;

calculating an average value of the first color of at least two pixels from among the plurality of pixels, the at least two pixels having a highest level of color similarity;

restoring a first color value of the first color for the first pixel to be restored;

restoring a second color value and a third color value for the first pixel to be restored based on an interpolation using a gradient of brightness; and displaying the first color value as the first color for the first pixel on the display, wherein calculating the average value of the first color comprises multiplying an arithmetic average value of the at least two pixels having the highest level of color similarity by the similarity value of the at least two pixels.

2. The method of claim 1, wherein calculating the color similarity among the plurality of pixels comprises regularizing first color values of the plurality of pixels adjacent to the first pixel to be restored.

3. The method of claim 1, wherein calculating the color similarity among the plurality of pixels comprises obtaining the color similarity among pixels of the first color adjacent to the first pixel to be restored.

4. The method of claim 1, wherein the plurality of pixels are arranged according to a Bayer pattern.

5. The method of claim 1, wherein the first pixel to be restored is a blue pixel.

6. The method of claim 1, wherein the first pixel to be restored is a red pixel.

7. The method of claim 1, wherein the first color is green.

8. The method of claim 1, wherein the second color is red.

9. The method of claim 1, wherein the third color is blue.

10. The method of clam 1, wherein calculating the color similarity among the plurality of pixels comprises obtaining a color similarity among upper, lower, right, and left pixels of the first color adjacent to the first pixel to be restored in a horizontal direction, a vertical direction, and a diagonal direction.

11. A method for interpolating pixel colors in a display of a digital system, the method comprising:

obtaining at least two pixels of the display, the at least two pixels being of a first color and having a highest level of color similarity, wherein the at least two pixels are adjacent to a first pixel to be restored;

calculating average values of the at least two pixels for the first color and restoring the value of the first color for the first pixel to be restored;

restoring a second color value and a third color value for the first pixel to be restored by an interpolation method using a gradient of a brightness; and displaying the first color value as the first color for the first pixel on the display, wherein calculating the average value of the first color comprises multiplying an arithmetic average value of the at least two pixels having the highest level of color similarity by a similarity value of the at least two pixels.

12. The method of claim 11, wherein the first color is green.

13. The method of claim 11, wherein the second color is red.

14. The method of claim 11, wherein the third color is blue.

15. The method of clam 11, wherein obtaining the at least two pixels of the first color having the greatest level of color similarity comprises obtaining a color similarity among upper, lower, right, and left pixels of the first color adjacent to the first pixel to be restored in a horizontal direction, a vertical direction, and a diagonal direction.

16. A method for interpolating pixel colors in a display of a digital system, the method comprising:

obtaining at least two green pixels of the display with a highest color similarity, wherein the at least two pixels are positioned adjacent to a first pixel to be restored;

calculating an average green value for the at least two pixels and thereby restoring the green value of the first pixel to be restored;

restoring a red value and blue value of the first pixel to be restored by an interpolation method using a gradient of a brightness; and displaying the first color value as the first color for the first pixel on the display, wherein calculating the average green value comprises multiplying an arithmetic average value of the at least two pixels having the highest level of color similarity by a similarity value of the at least two pixels.

17. The method of clam 16, wherein obtaining the at least two green pixels with the greatest color similarity comprises obtaining a color similarity among upper, lower, right, and left green pixels adjacent to a first pixel to be restored in a horizontal direction, a vertical direction, and a diagonal direction.

* * * * *